United States Patent
Anderson et al.

(10) Patent No.: US 7,505,512 B1
(45) Date of Patent: Mar. 17, 2009

(54) METHOD AND APPARATUS FOR COMBINING STATISTICAL EYE CHANNEL COMPLIANCE METHODS WITH LINEAR CONTINUOUS-TIME EQUALIZATION

(75) Inventors: Stephen D. Anderson, Chaska, MN (US); Matthew L. Bibee, Bloomington, MN (US)

(73) Assignee: Xilinx, Inc., San Jose, CA (US)

( * ) Notice: Subject to any disclaimer, the term of this patent is extended or adjusted under 35 U.S.C. 154(b) by 609 days.

(21) Appl. No.: 11/123,919

(22) Filed: May 5, 2005

(51) Int. Cl.
*H03H 7/30* (2006.01)
*H03H 7/40* (2006.01)
*H03K 5/159* (2006.01)

(52) U.S. Cl. ...................... 375/229; 375/224
(58) Field of Classification Search .................. 375/229, 375/231, 232, 233, 224, 350; 708/300, 819
See application file for complete search history.

(56) References Cited

U.S. PATENT DOCUMENTS

| | | | | |
|---|---|---|---|---|
| 6,167,082 A | * | 12/2000 | Ling et al. | 375/233 |
| 2001/0033615 A1 | * | 10/2001 | Kokuryo et al. | 375/231 |
| 2005/0008070 A1 | * | 1/2005 | Wang et al. | 375/232 |
| 2005/0259770 A1 | * | 11/2005 | Chen | 375/346 |
| 2006/0067394 A1 | * | 3/2006 | Chen | 375/229 |

* cited by examiner

*Primary Examiner*—Jean B Corrielus
(74) *Attorney, Agent, or Firm*—LeRoy D. Maunu; Kim Kanzaki; Lois D. Cartier

(57) ABSTRACT

A method and apparatus for combining statistical eye channel compliance methods with linear continuous-time equalization. A set of equalizer parameters is processed with measured channel parameters to create a set of modified parameters that are then used with a statistical eye algorithm. This technique allows for the addition of linear continuous-time equalization with or without modification of the existing statistical eye algorithm.

12 Claims, 19 Drawing Sheets

METHOD AND APPARATUS FOR COMBINING STATISTICAL EYE CHANNEL COMPLIANCE METHODS WITH LINEAR CONTINUOUS-TIME EQUALIZATION

COMPUTER CODE APPENDICES

This application includes a computer program-listing appendix on two duplicate compact discs, the contents of which are incorporated herein by reference in their entirety. Each compact disc contains a first 23 KB file entitled "Appendix A.txt" created Feb. 11, 2005, a second 6 KB file entitled "Appendix B.txt" created Feb. 11, 2005, a third 2 KB file entitled "Appendix C.txt" created Feb. 11, 2005, and a fourth 11 KB file entitled "Appendix D.txt" created Feb. 11, 2005.

FIELD OF THE INVENTION

This disclosure relates in general to a method and apparatus for combining statistical eye channel compliance methods with linear continuous-time equalization.

BACKGROUND

Standards have been established for the exchange of electrical signals among processing devices. Processing devices include integrated circuit systems built on and using printed circuit boards by an increasingly wide array of suppliers. Architecture standards ensure that the various devices will, in fact, be able to communicate with one another as well as with central processing units that control the operation of such devices. These devices include high speed communication devices.

A channel is a pathway, e.g., physical, optical, etc., between the transmitters/receivers of individual devices such as cards, central processor, memory, etc., of a data transmission system as well as external interfaces. It is an important goal to provide a signal exchange between systems with little or no disruption.

Increasingly, an important feature of a communication channel is to provide for the transfer of greater quantities of signals (bandwidth) at faster propagation rates (high speed). Unfortunately, physical limitations, impedance, jitter, crosstalk, etc. associated with the physical interconnections and signal drivers and receivers can restrict high bandwidth, high speed signal transfer.

As transmission speeds move to 10 Gbps and beyond, designers must consider individual performance capabilities of components as well as the capabilities they exhibit when implemented in a system architecture. The interaction between components and channel results in unpredictable losses. This unpredictable nature limits the effectiveness of better materials and devices intended to compensate for predictable losses.

Many popular forms of encoding of the serial data result in signal frequencies in excess of 1 GHz. At such high frequencies, ISI (intersymbol interference) is often a problem. Intersymbol interference in a digital transmission system is the distortion of the received signal, which distortion is manifested in the temporal spreading and consequent overlap of individual pulses to the degree that the receiver cannot reliably distinguish between changes of state, i.e., between individual signal elements. At a certain threshold intersymbol interference will compromise the integrity of the received data. Intersymbol interference may be measured by eye patterns.

The integrity of the received data may be restored through equalization. Equalization may be used to correct the overlap of individual pulses, such that a receiver can again distinguish between individual signal elements. The equalized signal may then be subsequently processed with far less chance of error.

In digital communications an "eye diagram" is used to visualize how the waveforms used to send multiple bits of data can potentially lead to errors in the interpretation of those bits. Eye measurements are often used as an indication of the quality of the received and/or equalized signal. However, channel impairments tend to close the eye. More specifically, distortion of a signal waveform due to intersymbol interference and noise appears as closure of the eye pattern. A closed eye is indicative of a signal that cannot be received without an excessively high error rate. Thus, providing equalization to open the eye is essential. The sources of eye closure include jitter in the transmit and receive devices, ISI, and crosstalk. The statistical eye is a mathematical construct similar to an eye diagram, in which the statistical nature of these sources of eye closure are taken into account.

The statistical eye is an algorithm that effectively shows the probability of a given eye opening, given measurements of channel S-parameters, crosstalk S-parameters, and device (transmit and receive) jitter. Or, if a given eye opening at a given probability level is specified, the statistical eye becomes a tool to verify channel compliance. The original statistical eye algorithm incorporates two forms of equalization: feed-forward and decision-feedback. It is capable of determining the best equalizer of a given size or the best equalizer subject to a set of constraints. Channel compliance can then be verified assuming that interoperating devices will use equalizers of a given complexity.

Some communicating devices may implement Continuous-Time Equalization. This is an analog filter that shapes the frequency response—usually to invert the frequency response magnitude of the channel. Given that such devices exist, it can be seen that there is a need for a method and apparatus that incorporates Continuous-Time Equalization into the statistical eye channel compliance.

SUMMARY OF THE INVENTION

To overcome the limitations described above, and to overcome other limitations that will become apparent upon reading and understanding the present specification, the present invention discloses a method and apparatus for combining statistical eye channel compliance methods with linear continuous-time equalization.

In an exemplary embodiment the present invention solves the above-described problems by processing equalizer parameters and channel parameters to create a set of modified parameters that are then used with the statistical eye algorithm. This technique allows for the addition of linear continuous-time equalization with or without modification of the existing statistical eye algorithm.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides a method and apparatus for combining statistical eye channel compliance methods with linear continuous-time equalization. A set of equalizer parameters are processed along with channel parameters to create a set of modified parameters that are then used with the statistical eye algorithm. This technique allows for the addition of linear continuous-time equalization with no modification of the existing statistical eye algorithm.

Many popular forms of encoding of the serial data result in signal frequencies in excess of 1 GHz. At such high frequencies printed circuit traces (and copper cables) are known to introduce frequency-dependent attenuation, in the forms of skin effect and dielectric absorption. This attenuation subjects the transmitted signal to ISI (intersymbol interference). The resulting received signals may be severely distorted, so that correct reception (without bit errors) becomes difficult or impossible. Equalization may be used to correct the attenuation caused by printed circuit traces. The equalized received signal may then be subsequently processed with far less chance of error.

Eye measurements are often used as an indication of the quality of the received and/or equalized signal. Channel impairments tend to close the eye. A closed eye is indicative of a signal that cannot be received without an excessively high error rate. The disclosed invention applies to channels and data rates that often or usually result in a closed eye. Equalization to open the eye is essential.

Figure 1:
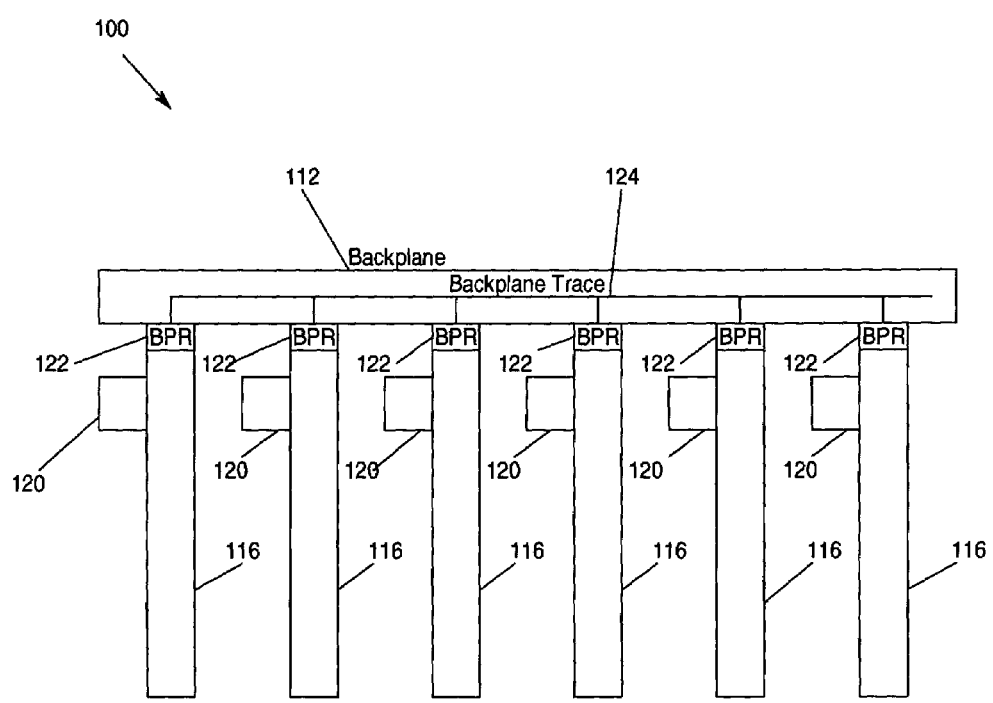
FIG. 1 illustrates the physical layout of a system according to an embodiment of the present invention.

FIG. 1 illustrates the physical layout of a system 100 according to an embodiment of the present invention. System 100 provides for correction of the distortion effects of a backplane 112, wherein at least a first circuit board 116a and a second circuit board 116b communicate via a backplane trace 124. In practice, several different circuit boards 116a-f, for example, are inserted into the same backplane, which is used for communication between circuit boards 116a-f as well as with other elements inserted into the backplane.

In this system 100, the first circuit board 116a contains a transmitter 120 and the second circuit board contains a receiver 122 for communication along the backplane 112. Both transmitter and receiver are located near the junction point of their respective circuit boards 116a and 116b. The first circuit board 116a also contains a receiver 122 and the second circuit board 116b also contains a transmitter 120 to facilitate two-way communication between the two boards. Each transmitter may generate a training sequence that is transmitted to the receiver 122 on a second circuit board 116b at relatively short intervals through the high speed backplane. The receiver 122 located on the second circuit board 116b may then read the training sequence signal to determine parameters for correcting for errors from subsequent signals.

Figure 2:
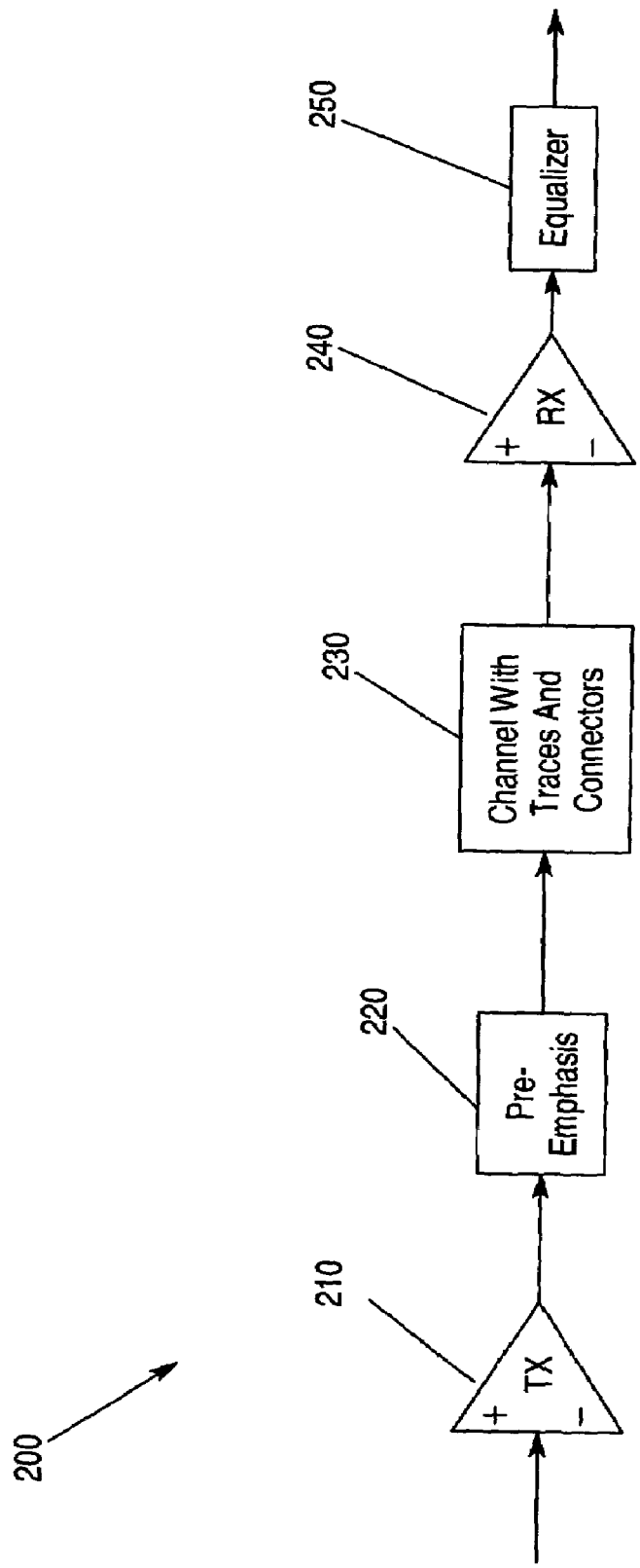
FIG. 2 illustrates a model of a channel.

FIG. 2 illustrates a model 200 of a channel. In FIG. 2, a transmitter 210 transmits a signal via a pre-emphasis network 220. The pre-emphasis network 220 is a network inserted in a system in order to increase the magnitude of one range of frequencies with respect to another. At the transmitter 210, the high-frequency components of a signal are accentuated, or emphasized by the pre-emphasis network 220 with the goal that by the time the signal reaches the receiver 240, via a PCB channel 230, the high frequency portion will be attenuated to the desired level. The pre-emphasized signal is transmitted through the channel 230. The characteristics of the channel 230 (printed circuit board, connectors, coaxial cable) exhibit significant loss for Gbps signals. Printed circuit boards and connectors are the cause of large contributions to loss and signal distortion. Knowledge of the characteristics of the channel 230 is essential for system designers and circuit designers. A receiver 240 is provided for receiving the signal from the channel 230. The receiver 240 at the end of the channel 230 requires a specific signal level to identify the transmitted signal. Equalization 250 is provided after the receiver 240 to improve performance without increasing the peak transmitter power. As will be explained below, the eye diagram based on the output of the receiver 240, in the absence of equalizers 220 and 250, will likely be closed due to the distortion effects.

From FIG. 2, given a reference transmitter TX 210 and a reference receiver RX 240, there are many choices for the channel 230 that connects them. For example in FIG. 1, the first circuit board 116a and the second circuit board 116b communicate via a channel which includes backplane trace 124A. Various factors, such as channel length, material, connectors, density and layout design determine whether a selected channel of a plurality of available channels meets certain predetermined performance requirements. In one embodiment, a channel is compliant if a designated transmitted pulse travelling through the channel can be received by a designated receiver with some predetermined probability. In order to determine if the channel is compliant, S-parameters are measured. These measured S-parameters can be used by a simulator having a set of Matlab scripts to produce a statistical eye, which will be described further below. If the statistical eye opening meets the requirements, then the channel is compliant.

For channels that have a high probability of eye closure at the receiver, in one embodiment of the present invention, the statistical eye model includes mathematical algorithms that implement the forms of equalization in 220 and 250 of FIG. 2. In one embodiment, the equalizer is in the form of a combination of a FIR filter and a decision feedback equalizer (DFE). Equalization of a channel in the statistical eye context means that FIR coefficients or DFE coefficients are chosen to force some part of the channel pulse response to zero. The implication is that those channels that have a significant portion of their pulse response outside of the zeroed region would not comply; and that channels with most of their pulse response inside the zeroed region would comply. In another embodiment the equalizer in the form of a combination of a FIR filter and a continuous time equalizer.

Figure 3:
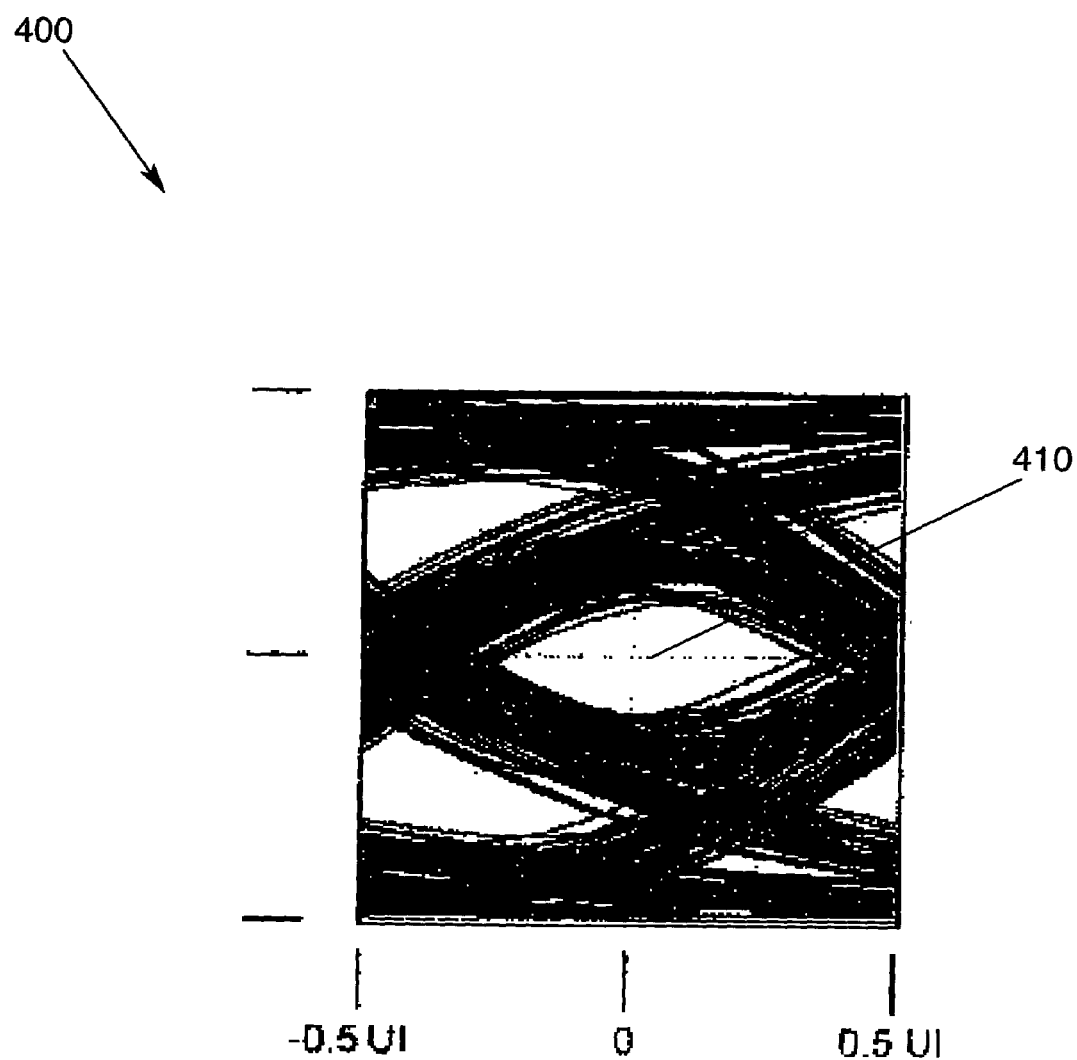
FIG. 3 illustrates a typical oscilloscope type of eye diagram.

FIG. 3 illustrates a typical oscilloscope type of eye diagram 400. The eye diagram 400 is generated, for example, by applying the received signal to an oscilloscope that is capable of overlaying multiple waveforms. The scope trigger signal is a high-pass filtered version of the received signal. If a sufficient number of these overlaid waveforms are accumulated, the eye 410 would become smaller and eventually the eye might close. This suggests that one or more random variables are at work and that a more correct approach to looking at the received signal is to look at its statistics.

A statistical eye is derived from channel S-parameter measurements, from device (e.g., transmitter and receiver) jitter modeled according to the MJS (Method of Jitter Specification), i.e., the Fiber Channel Dual Dirac model, and from cross talk S-parameter measurements. MJS can simply be described as a model of random jitter (RJ) and deterministic jitter (DJ) produced by serializer/deserializer (SERDES) devices. The MJS model is useful when received signal amplitudes are almost constant, which is a good approximation at lower data rates. As the data rate increases, the attenuation in the channel becomes the predominant source of distortion. The conventional MJS method does not take this into account.

The statistical eye expands on MJS by including the effects of the channel, which are inter-symbol interference (ISI) and crosstalk. Assuming that random data are transmitted, the channel ISI and crosstalk are random variables. The statistical eye combines RJ, DJ, channel ISI, and crosstalk in statistical fashion to show the probability of eye opening based on all 4 of these random variables. With the inclusion of channel ISI and crosstalk, there is now a vertical dimension to the statistical description of the signal.

Figure 4:
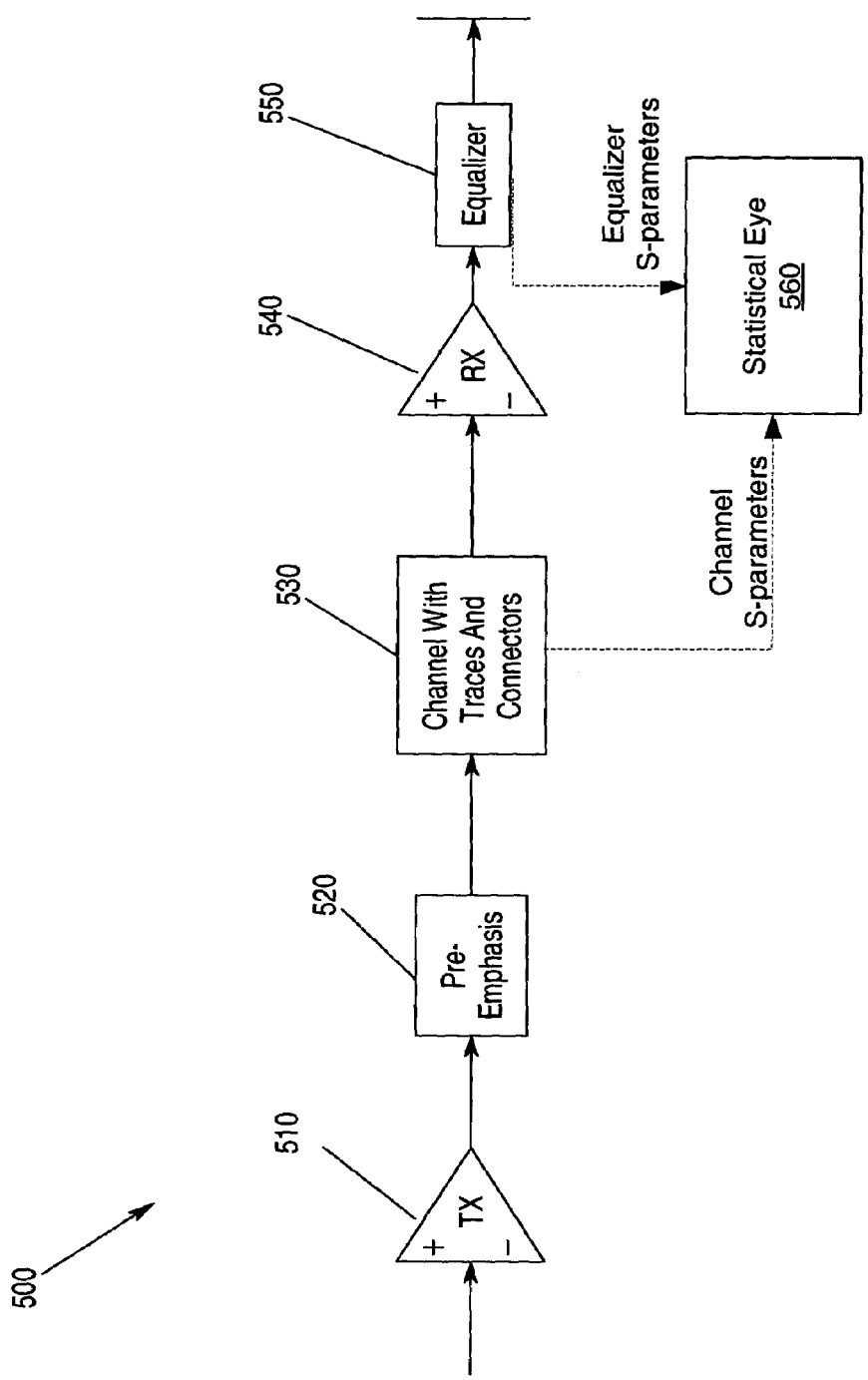
FIG. 4 illustrates a model of a channel with the statistical eye after the model receiver.

FIG. 4 illustrates a model 500 of a channel with the statistical eye after the model receiver. In FIG. 4, a transmitter 510 transmits a signal via a pre-emphasis network 520. Signals from the pre-emphasis network 520 are sent to the receiver 540 via a channel 530. Equalization 550 is provided after the receiver 540 to improve performance without increasing the peak transmitter power. In one embodiment the equalizer 550 includes a linear continuous-time equalizer. The statistical eye 560 receiving measured channel S-parameters from channel 530 and equalizer parameters from equalizer 550, combines RJ, DJ, channel ISI, and crosstalk in a statistical fashion to compensate for channel impairments to open the eye. The opened eye can now be checked against the requirements to determine channel compliance. Some or all of the components of model 500 may be implemented using software-based methods.

Figure 5:
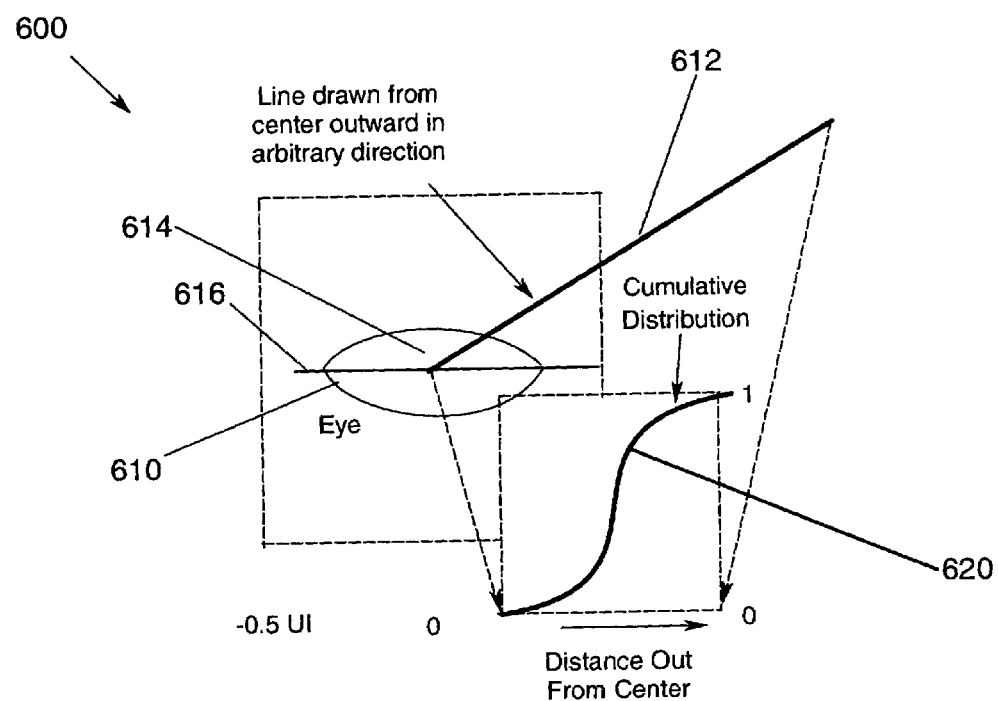
FIG. 5 illustrates a diagram of the cumulative distribution along a radial line.

FIG. 5 illustrates how the statistical eye may be generated intuitively. If a radial line 612 is drawn outward, starting from the center of an oscilloscope eye (FIG. 3), the probability that the signal will be encountered increases with the radial distance. A cumulative distribution 620 along the line 612 may be envisioned as shown in FIG. 5. The cumulative distribution 620 shows the probability that the signal will be found within some distance from the center 614.

Figure 6:
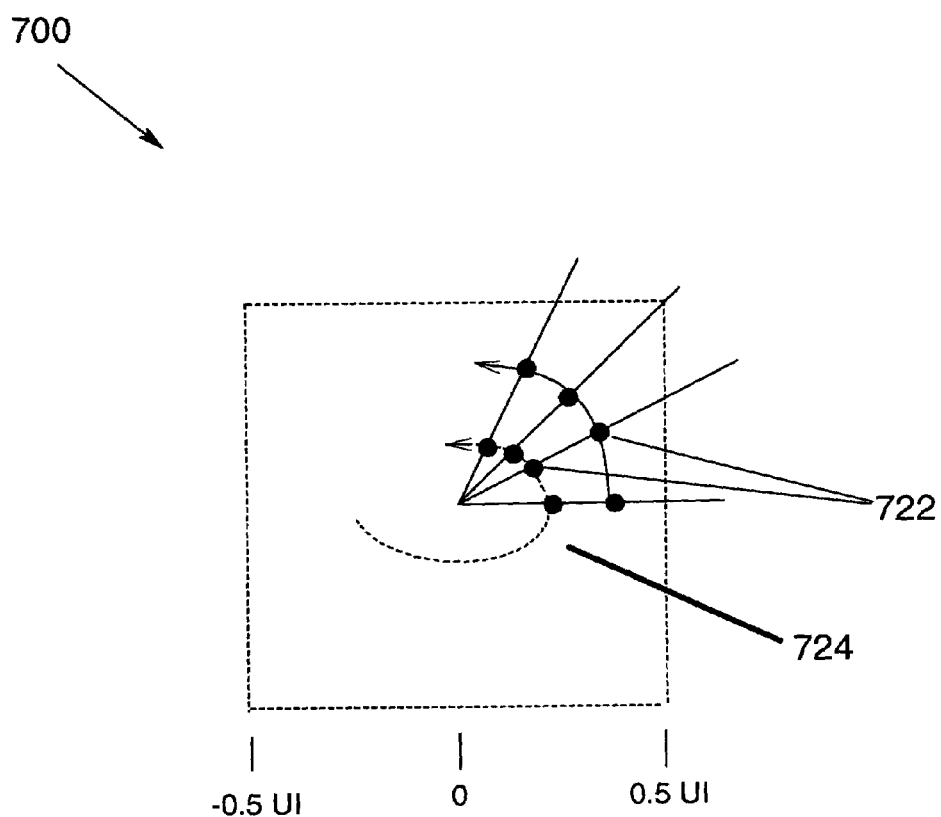
FIG. 6 illustrates an eye diagram model having plurality of lines radiating out in all directions.

FIG. 6 illustrates an eye diagram model 700 having plurality of lines radiating out in all directions. If points of equal probability 722 in each of the lines are connected, a line of constant probability 724 may be drawn by connecting the points 722.

Figure 7:
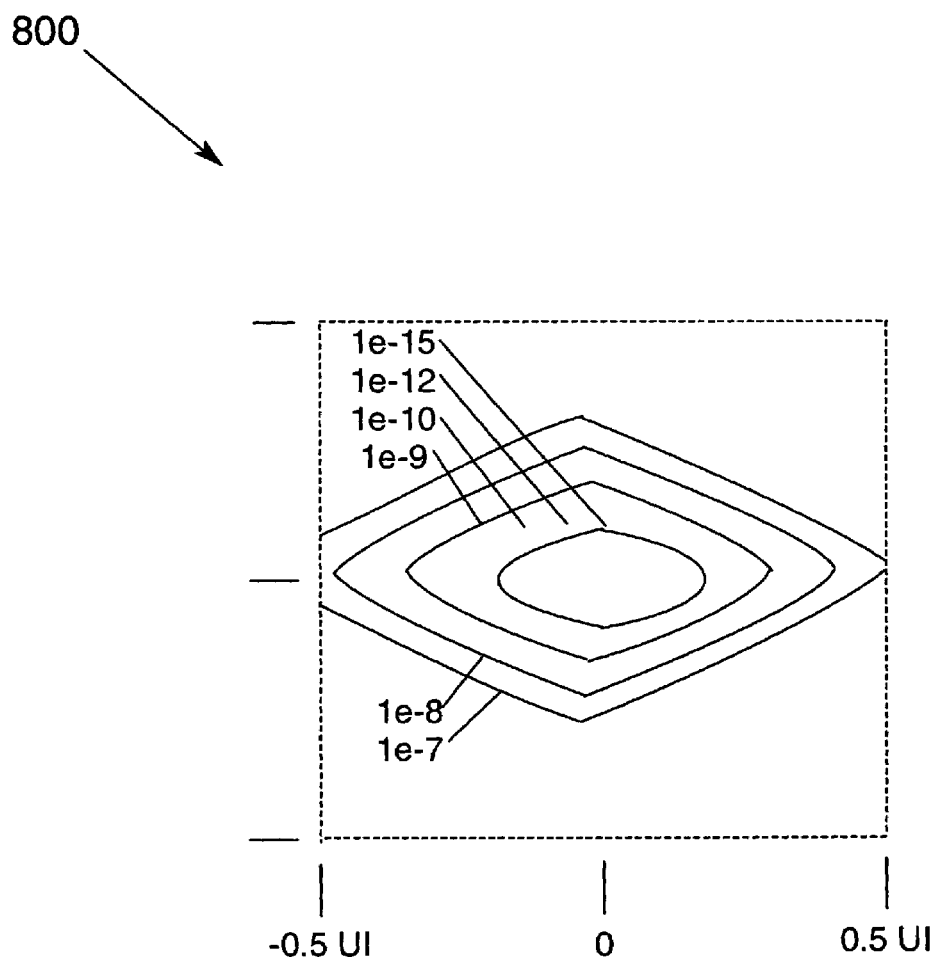
FIG. 7 illustrates a contour map developed from the process described in FIG. 7.
Figure 8:
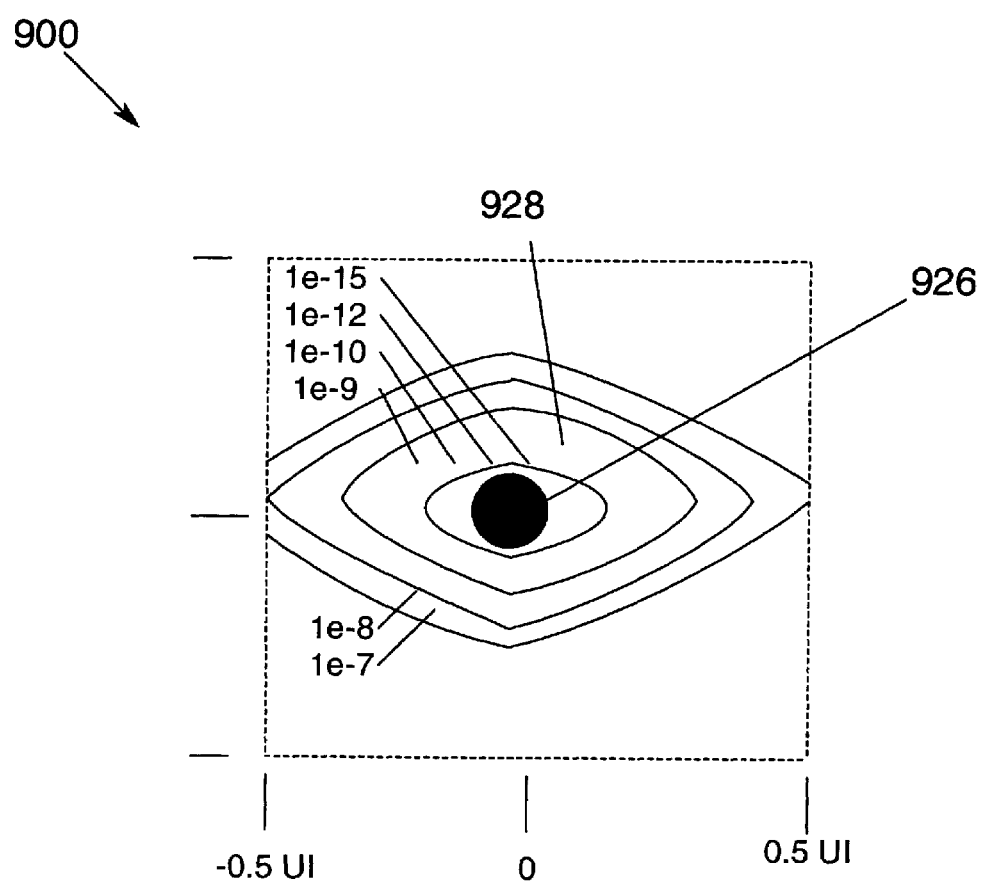
FIG. 8 is a contour map with a circle disposed within the 1e-15 contour line.
Figure 9:
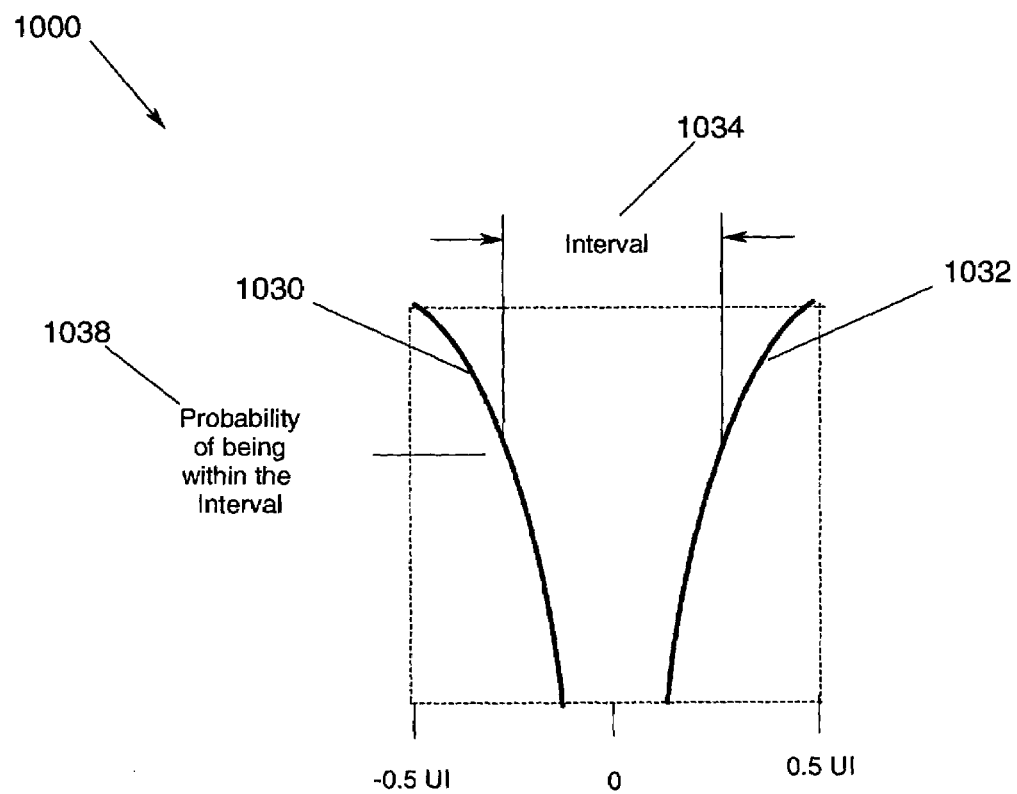
FIG. 9 illustrates two cumulative distribution functions (cdfs) that form the bathtub curve that is used in MJS.

FIG. 7 illustrates a contour map 800 developed from the process described in FIG. 6. This contour map 800 is the statistical eye. If a small circle 926 is drawn entirely within the 1e-15 region 928 of the contour map 900 as illustrated in FIG. 8, the probability of the signal being found within this circle 926 must be less than 1e-15. If the receiver will correctly detect any signal that remains outside of this circle 926, the implication is that the BER must be less than 1e-15. Notice that, in FIG. 5, if the horizontal axis 616 is chosen for the radial lines, then the two cumulative distribution functions (cdfs) 1030, 1032 as illustrated in FIG. 9 form the bathtub curve that is used in MJS. For an interval 1034, the curves 1030, 1032 indicated the probability 1038 of being with the interval 1034.

The statistical eye may also be derived mathematically using a 2-dimensional probability distribution function (pdf), such that the probability of the signal being found within an infinitesimal area $dS=rdrd\theta$ at the sampling instant is given by $$P=p(r,\theta)rdrd\theta$$

where $p(r, \theta)$ is the 2-dimensional pdf using polar coordinates. If an integration is performed over a very small angle=$\delta$, then $p(r, \theta)$ is approximately independent of $\theta$ within the small angle considered. The result is that $$P = \int_0^\delta d\theta \int p(r, \theta)rdr = \delta \int p(r, \theta)rdr$$

Then the probability within a narrow triangle out to a distance of R is $$P(r<R) = \delta \int_0^R p(r,\theta) r\, dr$$

In the limit, as δ approaches zero, the triangle becomes a line. To get some measure of probability that is independent of the size of δ, the above result may be normalized to δ to provide the following:

$$P_N(r<R) = \int_0^R p(r,\theta) r\, dr$$

$P_N$ is the measure of probability that would be computed numerically. To get back to true probability, use $$P(r<R) = \frac{\int_0^R p(r,\theta) r\, dr}{\int_0^{RLarge} p(r,\theta) r\, dr}$$

where the limit RLarge is a value of R sufficient to include the entire range of signal positions.

Figure 10:
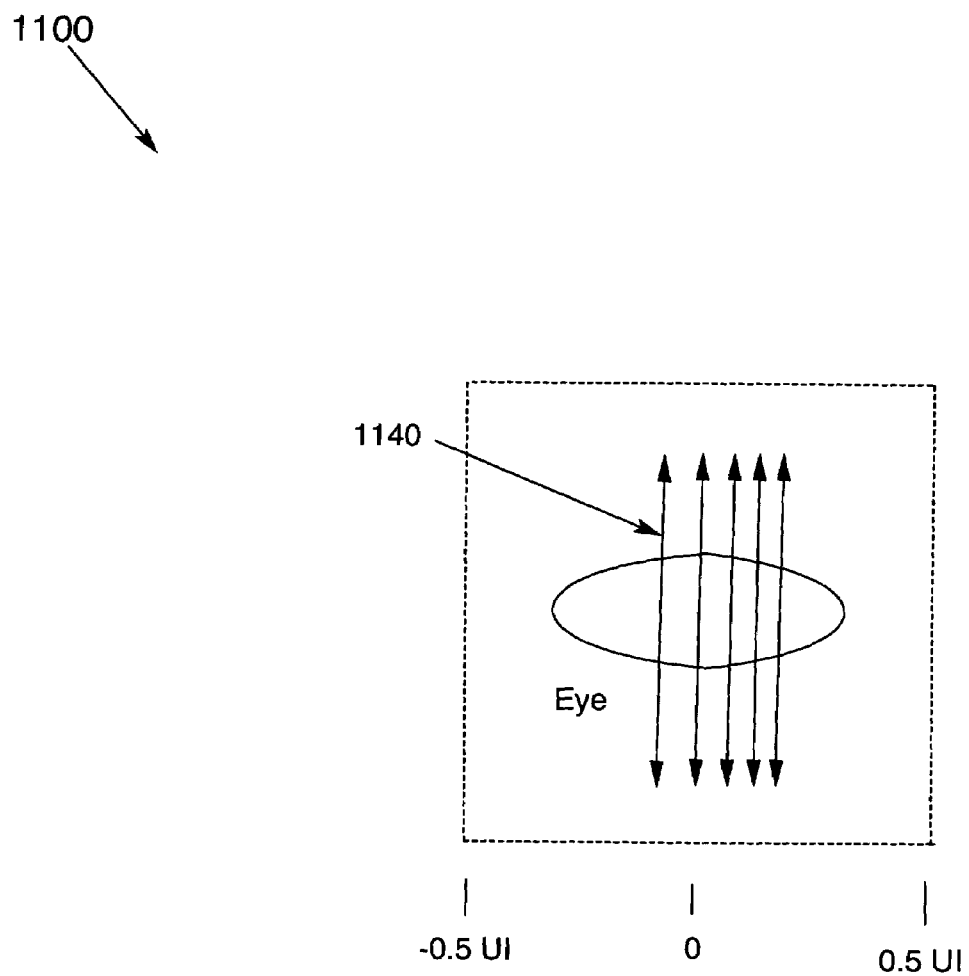
FIG. 10 illustrates using vertical lines in the eye diagram to derive a contour map.

Finally, generating a contour amounts to choosing a bunch of different values of θ, and for each one, finding the R that maintains a constant P. Suppose that, instead of using radial lines in FIG. 5, vertical lines 1140 as shown in the eye diagram 1100 of FIG. 10 are used. The resulting contour map must be the same as it is for radial lines. In this case the small angle used above becomes a small separation of the vertical lines 1140.

For vertical lines 1140 the 2-dimensional pdf is p(x,y) and the probability of finding the signal in a specific region becomes $$P = \iint p(x,y)\,dx\,dy$$

Here x and y are the horizontal and vertical positions. The reason for using rectangular coordinates is that it allows the pdf to be split into two pdfs, one of which depends only on x. From probability theory:

$$p(x,y) = p_y(y|x) p_x(x)$$

where $p_y(y|x)$ is a conditional pdf of y given x and $p_x(x)$ is a pdf of x, independent of y. The reason for breaking up p(x,y) in this way is that channel ISI and crosstalk can be represented by a pdf of the form $p_y(y|x)$; and DJ and RJ can be represented by $p_x(x)$.

Figure 11:
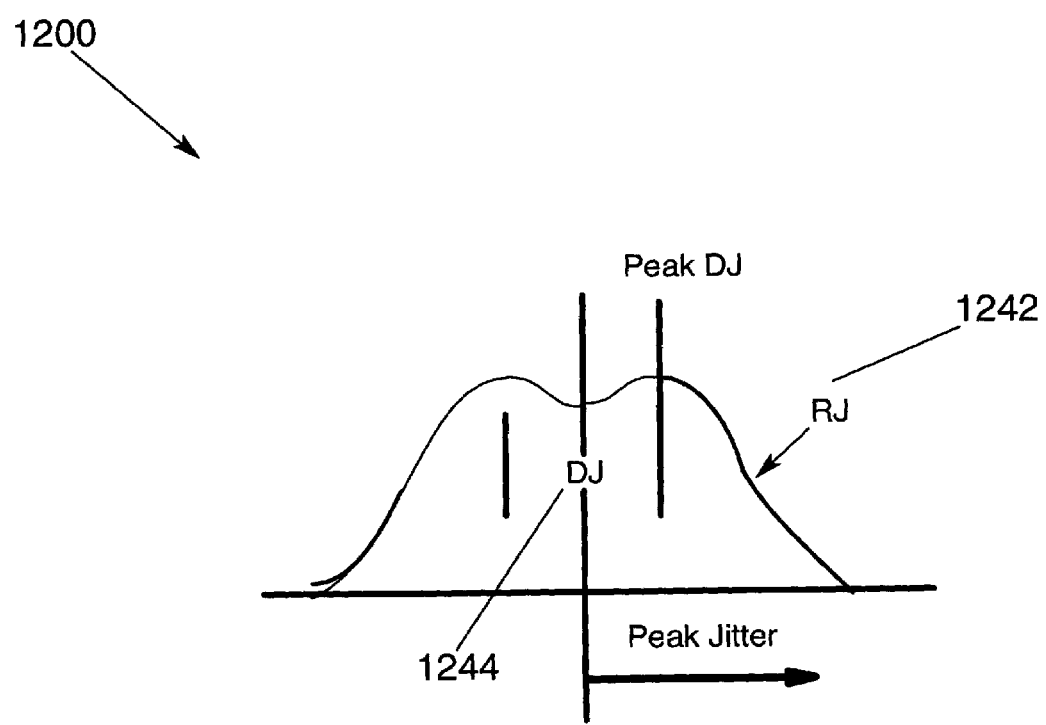
FIG. 11 is a plot of $p_x(x)$ representing random and deterministic jitter.

For $p_x(x)$, the MJS pdf for jitter may be used. This is called the "Dual Dirac" function and assumes that x is the sum of two random variables—one having a normal or Gaussian pdf representing random jitter and a second pdf consisting of two delta (Dirac) functions, i.e., x can have only one of two values, representing non-ISI deterministic jitter. $p_x(x)$ is the convolution of these two pdfs and is given by $$p_x(x) = \frac{G(-DJ, RJ, x) + G(DJ, RJ, x)}{2}$$

where G(μ, σ, x) is the Gaussian pdf with mean p and variance σ. FIG. 11 is a plot 1200 of $p_x(x)$ representing random and deterministic jitter. The RJ 1242 and DJ 1244 contributions are identified in FIG. 11. Note that the effects of both the transmitter and receiver in $p_x(x)$ may be included. Once DJ 1244 and RJ 1242 of FIG. 11 are specified, an analytical expression for $p_x(x)$ results. This will be used later, after $p_y(y|x)$ is derived.

Figure 12:
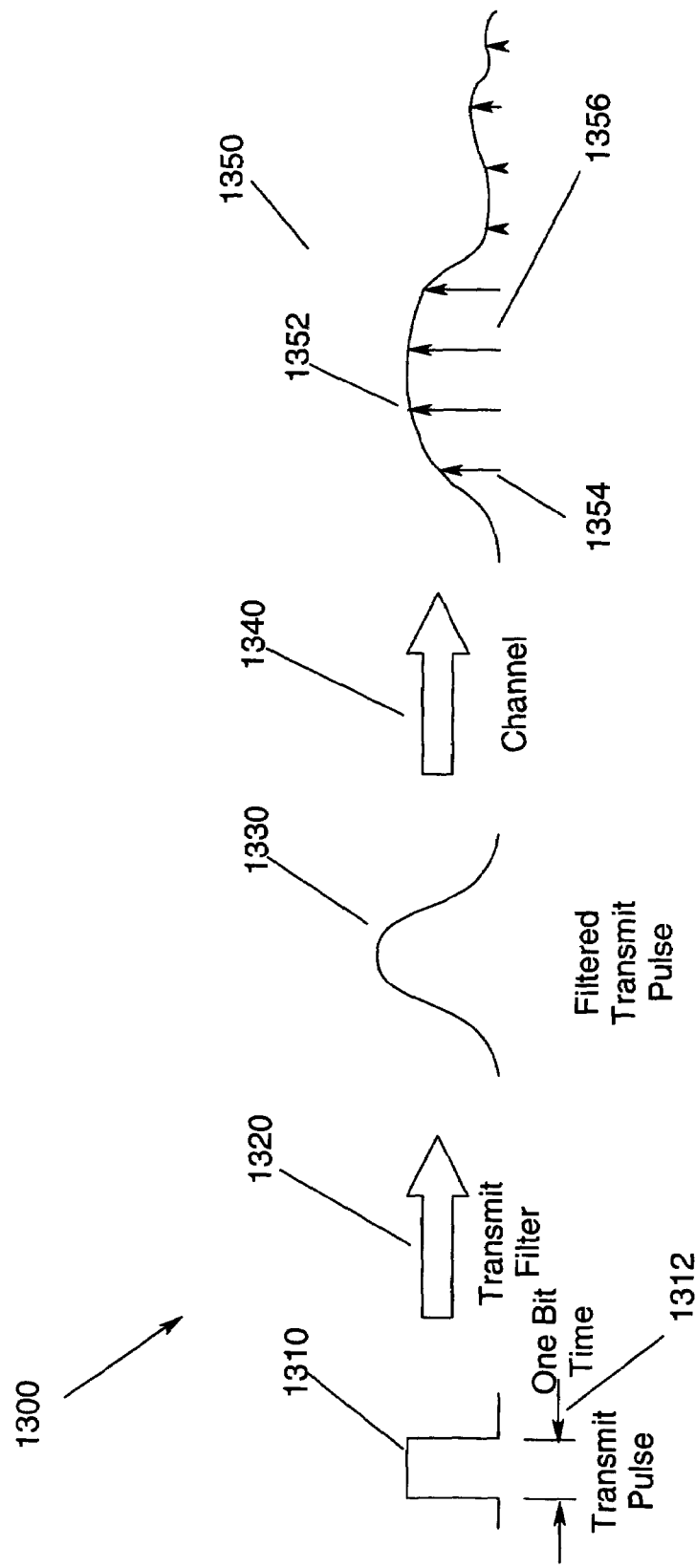
FIG. 12 illustrates a diagram of the pulse response.

The pdf for amplitude $P_y(y|x)$ is found next. For the moment crosstalk will be neglected. FIG. 12 illustrates a diagram 1300 of the pulse response. A transmitted signal is assumed to consist of positive and negative pulses. Let a square pulse 1310 having a width of one bit time 1312 be applied to a transmit filter 1320 and the result 1330 applied to the channel 1340. The response 1350 at the output of the channel 1340 will often be a pulse that is spread over many bit times. Suppose that this response 1350 is sampled at the bit rate and that it is completely sampled from beginning to end. That is, if one more sample were taken prior to the first or after the last, its value would be zero. Although the choice is arbitrary, the largest sample is often called the cursor 1352. The other samples are called pre-cursors 1354 and post-cursors 1356. The samples are often identified as $C_{-2}$, $C_{-1}$, $C_0$, $C_1$, $C_2$, $C_3$, . . . where the 0 subscript refers to the cursor sample, negative subscripts refer to pre-cursor samples, and positive subscripts refer to post-cursor samples. The samples are collectively called just 'cursors'. Note that the phase of the sampling clock is arbitrary.

An actual received signal will be the sum of the responses to a series of such transmitted pulses. Now, suppose that the entire pulse response is zero except for $C_0$ and $C_1$. If random data was transmitted with possible values of +1 and −1, then a given sample of the received signal can have only the values $(-C_0-C_1)$, $(-C_0+C_1)$, $(+C_0-C_1)$, or $(+C_0+C_1)$. That is, there are only 4 possible amplitudes for the received sample; and these can result only from the current bit and the preceding one. Similarly, if there are N non-zero cursors, then there are 2^N (two to the Nth power) possible values for a given sample. The possible values for a given sample will always be symmetrically distributed around 0.

Figure 13:
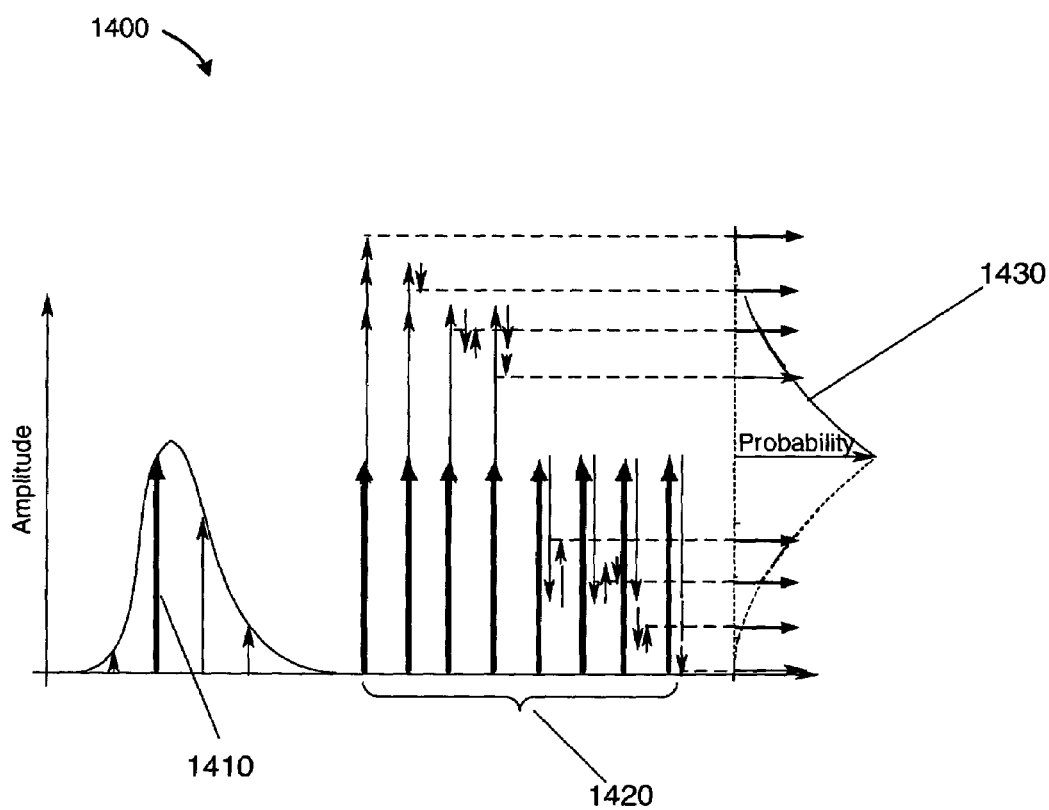
FIG. 13 is a plot illustrating the distribution of positive sample values for pulse response length of 4.

FIG. 13 is a plot 1400 illustrating the distribution of positive sample values for pulse response length of 4, i.e., N=4. In this case the sample is the cursor 1410. It is being summed with every combination of the pre- and post-cursors to give the 8 different positive amplitude levels 1420. A pdf with a mean value equal to the cursor amplitude is formed. The dotted curve 1430 is simply am illustration of the levels representing a pdf. The actual pdf has 8 equi-probable discrete values. That is, the pdf for positive values would be given by $$p_{yy}(y) = \sum_{n=1}^{8} \frac{\delta(y-y_n)}{8}$$

where δ( ) is a delta function, and the $y_n$ are the discrete amplitude values. If the negative half of $p_{yy}(y)$ had been included, the mean would be 0 and there would be 16 equi-probable discrete levels. As the number of cursors increases $p_{yy}(y)$ starts to approach a continuous distribution. For example, with just 10 cursors there are $2^{10}$=1024 amplitude combinations.

In the discussion above, $p_{yy}(y)$ was generated for a particular phase of the sampling clock. Or, in other words, it was generated for a particular position x=$x_0$ within the Unit Interval. Some other position would have given a different set of cursors and a different histogram. The dependence on x may be acknowledged by $$p_{yy}(y)=p_y(y|x_0)$$

If the sampling phase is moved a fraction of a UI to $x=x_1$ then the set of cursors changes and the result is $p_y(y|x_1)$. Repeating this across the whole Unit Interval gives a representation of $p_y(y|x)$.

The goal is to be able to draw a vertical line within the Unit Interval and find the pdf along this line. Let the line cross the horizontal axis at $x=x_s$. We find the amplitude pdf for this line by integrating $p(x,y)$ across all possible values of x. If the new pdf is called $p_s(y)$, then $$p_s(y)=\int p(x,y)dx=\int p_y(y|x)p_x(x)dx$$

Or, since $p_y(y|x)$ has been found only for discrete values of x $$p_s(y) = \sum_n p_y(y|x_n)p_x(x_n)\Delta x$$

This is the desired cdf for this particular vertical line. To find a probability along this line, start from y=0 and move up along this line (the bottom half does not have to be performed because of symmetry.), the probability that the signal will be less than $y=y_1$ is $$P(y < y_1) = \int_0^{y_1} P_s(y)dy$$

To generate a contour $y_1$ is adjusted for the desired probability. Then another vertical line is chosen and the process is repeated. All the points $y_1$ are then joined to form the contour.

Figure 14:
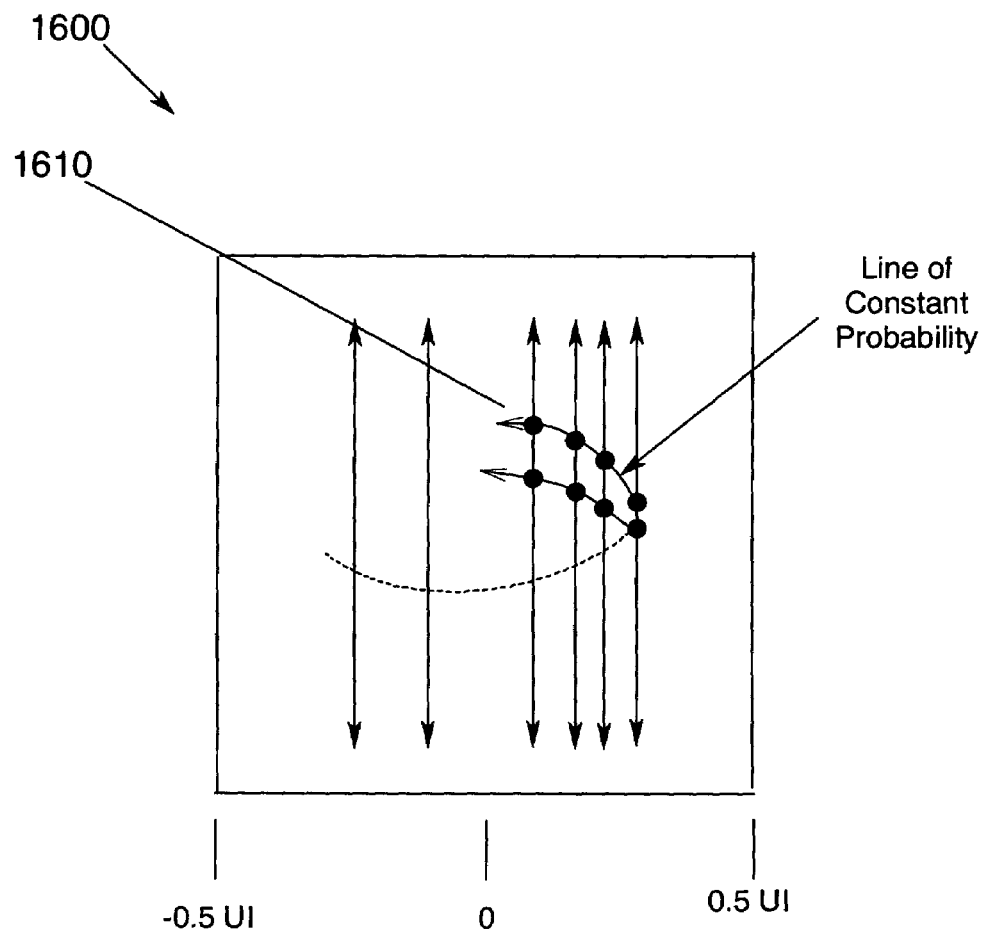
FIG. 14 illustrates a diagram showing the construction of the contours using vertical pdfs.

FIG. 14 illustrates a diagram 1600 showing the construction of the contours using vertical pdfs. In FIG. 14, each of the vertical lines 1610 has a different function $p_s(y)$. Each $p_s(y)$ exists as a histogram of perhaps several thousand bins. Notice that a given $p_s(y)$ is not the same as one of the $p_{yy}(y)$ functions found earlier. The $p_s(y)$ has taken jitter into account. A way of looking at this is that $p_s(y)$ is a $p_{yy}(y)$ but with contributions from neighboring (along the x axis) $p_{yy}(y)$ functions.

To generate the pulse response, it is necessary to have the transfer function of the channel. This involves the calculation of the S-parameters. A vector network analyzer is used to measure the 4-port S-parameters of the channel. Impedance mismatches may be included if desired. The transfer function is extracted and fast convolution techniques are used to find the pulse response. The pulse response of a crosstalk channel is found in the same way.

The pulse response is found for the crosstalk channel using exactly the same procedure as for the desired channel. This leads to a set of crosstalk cursors derived from the crosstalk channel. These crosstalk cursors are analogous to the cursors discussed previously. To avoid confusion the two sets of cursors will be called crosstalk cursors and channel cursors.

For the channel cursors an amplitude pdf $p_{yy}(y)$ for a given point along the x-axis is defined. This pdf was created by adding together the channel cursors (and their negative values) in every possible combination. To take into account the crosstalk, the statistical eye technique simply combines the channel cursors and crosstalk cursors into one master set of cursors; and generates the amplitude pdf by adding together all of the cursors (and their negative values) from this master set in every possible combination. In other words, if there were originally 16 channel cursors and 12 crosstalk cursors, the master set of cursors and their negatives would consist of 56 values. And the pdf would be generated by taking the sum of all 56 in every combination.

Most of the statistical eye algorithm can be discerned from the previous derivations related to p(x,y). The crucial part of the algorithm is the amplitude pdf $p_y(y|x)$. Recall that this results from the sum, in every possible combination, of the cursors and their negatives. If the pdf is derived by a brute force summing of cursors, the process can takes hours, days, or weeks. With only 10 cursors, for example, 1024 sums of 10 numbers are needed. This is effectively 10240 additions. 11 cursors would require 22528 additions.

The solution is to use convolution. The key observation is that random variables are being added. From probability theory, the pdf of the sum of two random variables is the convolution of their individual pdfs. The two random variables being summed can consist of a running total pdf and the next cursor pdf. To illustrate, let the pdfs of the first few non-zero cursors be pdf1, pdf2, pdf3, pdf4, etc. Let pdf1 be initially convolved with pdf2 to form a new pdf_called pdf_total. Now convolve pdf3 with pdf_total and let the result be the new pdf_total. If this is repeated for all of the remaining cursors, pdf_total becomes the pdf for all of the cursors summed in all combinations.

This may be easily demonstrated using an example involving the toss of some dice. The pdf of the sum of 4 dice will be derived. Each die is 6-sided and numbered 1 to 6. There are a few immediate observations that can be made.

The sum ranges from 4 to 24.

There are 1296 combinations (6 to the power 4).

The probability of the sum being 4 (or 24) is 1/1296.

One way to generate the pdf would be to find the sum for every possible combination. This is similar to the brute force approach of finding the pdf of the cursors. This would work, but it would take a long time because each of the 1296 combinations has to be examined to see which bin it goes into. The other approach is convolution. A single die has a discrete pdf of value 1/6 at each of the numbers 1 through 6. Mathematically the pdf is $$p_{die}(n)=\Sigma_{j=1}^{6} 1/6 \delta(n-j)$$

This pdf is convolved with itself to yield the table 1.

TABLE 1

| Value | Probability |
|-------|-------------|
| 2 | 1/36 |
| 3 | 2/36 |
| 4 | 3/36 |
| 5 | 4/36 |
| 6 | 5/36 |
| 7 | 6/36 |
| 8 | 5/36 |
| 9 | 4/36 |
| 10 | 3/36 |
| 11 | 2/36 |
| 12 | 1/36 |

This pdf is convolved twice more with $p_{die}(n)$ to yield the desired result. The first few probability values for the full (sum of all 4 dice) pdf are given in the table 2.

TABLE 2

| Value | Probability |
|---|---|
| 4 | 1/1296 |
| 5 | 4/1296 |
| 6 | 10/1296 |
| 7 | 20/1296 |
| 8 | 35/1296 |

Convolution involves shifting and adding of numbers. Its complexity increases approximately linearly with each added die. The complexity of the brute force approach increases exponentially with each added die. The use of convolution to find thousands of pdfs in a reasonable amount of time makes the statistical eye practical.

Of course it is possible that the statistical eye is a closed eye. For example, the 1e-6 contour has a maximum amplitude of 5 mV and a width of 5 pico-seconds. Thus, the 1e-7 contour is a dot at the center of the Unit Interval. Normally, equalizers at either the transmitter or the receiver or both would be used to try to correct this situation. In various embodiments the original statistical eye algorithm has several forms of built-in equalizers.

Because the original statistical eye algorithm generates and uses a set of cursors to describe the channel, it isn't surprising that the original equalizers were all digital filters. The original statistical eye algorithm supports both FIR and DFE equalizers. The user can specify the number of equalizer taps. A lengthy optimization process is used to find the best equalizer taps in the presence of jitter.

If one of these equalizers is specified as part of a channel compliance test, then supposedly it is possible to create hardware to work with this channel and the channel is deemed compliant.

The statistical eye algorithm using equalization consists of adjusting the channel cursors according to the type of equalizer specified; and then performing the rest of the statistical eye analysis as described above.

Figure 15:
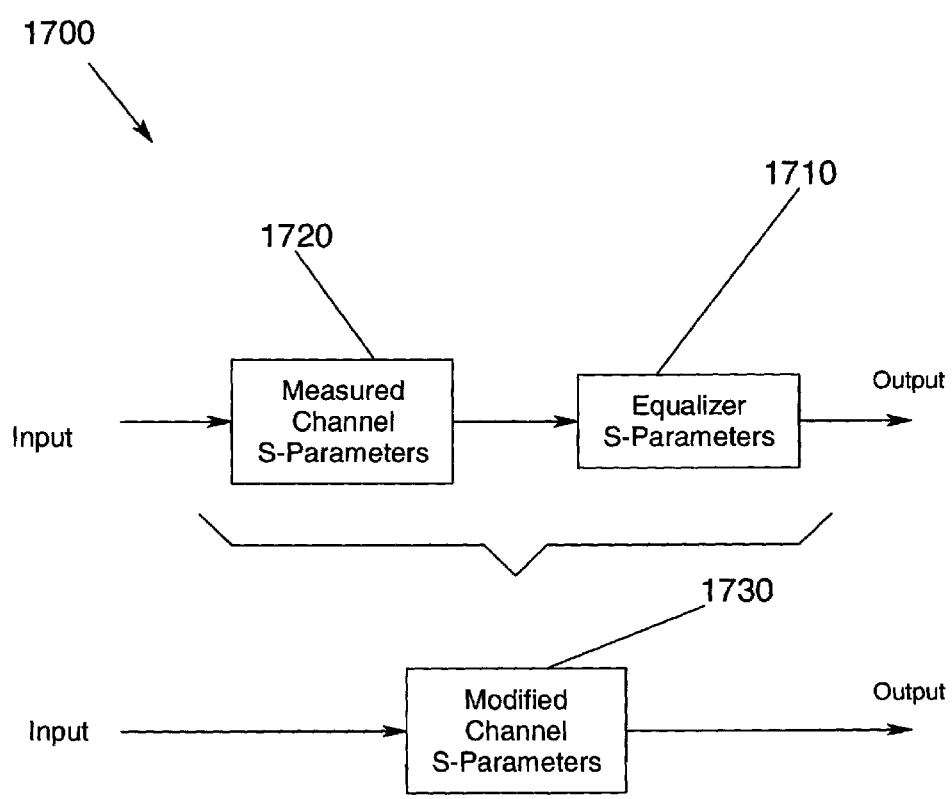
FIG. 15 illustrates a diagram demonstrating how linear continuous-time equalization may be achieved with no modification of the existing statistical eye algorithm according to an embodiment of the present invention.

FIG. 15 illustrates a diagram 1700 demonstrating how linear continuous-time equalization may be added to the existing statistical eye algorithm with no modification of the existing statistical eye algorithm according to an embodiment of the present invention. Linear continuous-time equalization is useful in some cases where this is the only form of equalization that a receiver implements. The desired linear continuous-time equalization is assumed to consist of a known set of transfer function poles and zeros. This complex transfer function is transformed to a set of S-parameters 1710 at the same frequencies that are used to measure the channel S-parameters 1720. This new set of Equalizer S-parameters 1710 is created in an ideal manner such that its reflection coefficients are all 0 and its differential transmission coefficients equal the desired complex transfer function. To achieve equalization the set of Equalizer S-parameters 1710 is chained with the measured channel S-parameters 1720 to create a set of modified S-parameters 1730 that are then used with the statistical eye algorithm.

This procedure is repeated for each set of measured Crosstalk S-parameters to yield a set of Modified Crosstalk S-parameters for each crosstalk path. The various forms of equalization that are built into the original statistical eye algorithm are turned OFF so that the only effective equalization is that which is present in the Modified Channel and Modified Crosstalk S-parameter sets. Accordingly, linear continuous-time equalization may be used with no modification of the existing statistical eye algorithm.

Figure 16:
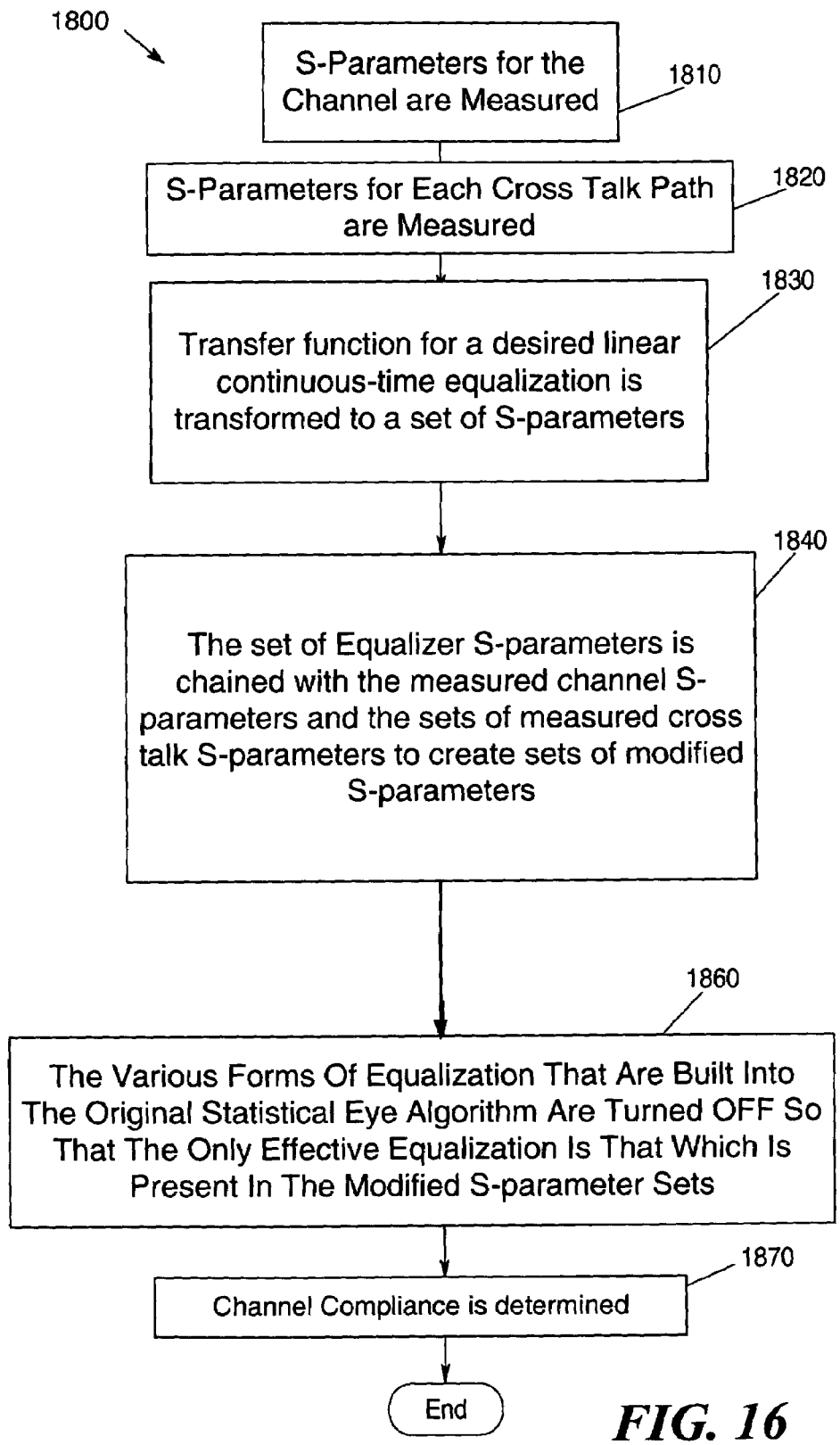
FIG. 16 illustrates a flow chart of the method for achieving linear continuous-time equalization with no modification of the existing statistical eye algorithm according to an embodiment of the present invention.

FIG. 16 illustrates a flow chart 1800 of the method for achieving linear continuous-time equalization with no modification of the existing statistical eye algorithm according to an embodiment of the present invention. The S-parameters for the channel are measured at step 1810. A set of S-parameters is measured for each one or more cross talk paths at step 1820. A transfer function for a desired linear continuous-time equalization is transformed to a set of S-parameters at the same frequencies that are used to measure the channel S-parameters at step 1830. This new set of Equalizer S-parameters is created in an ideal manner such that its reflection coefficients are all 0 and its differential transmission coefficients equal the desired complex transfer function. The set of Equalizer S-parameters is chained with the measured channel S-parameters and a first set of measured cross talk S-parameters for a first cross talk path to create a first set of modified S-parameters. Next the set of Equalizer S-parameters is chained with the measured channel S-parameters and a second set of measured cross talk S-parameters for a second cross talk path to create a second set of modified S-parameters, and so forth for the rest of the measured cross talk S-parameters sets at step 1840. Next at 1860, the various forms of equalization that are built into the original statistical eye algorithm are turned OFF so that the only effective equalization is that which is present in the Modified S-parameter sets. At step 1870 channel compliance is determined.

Figure 17:
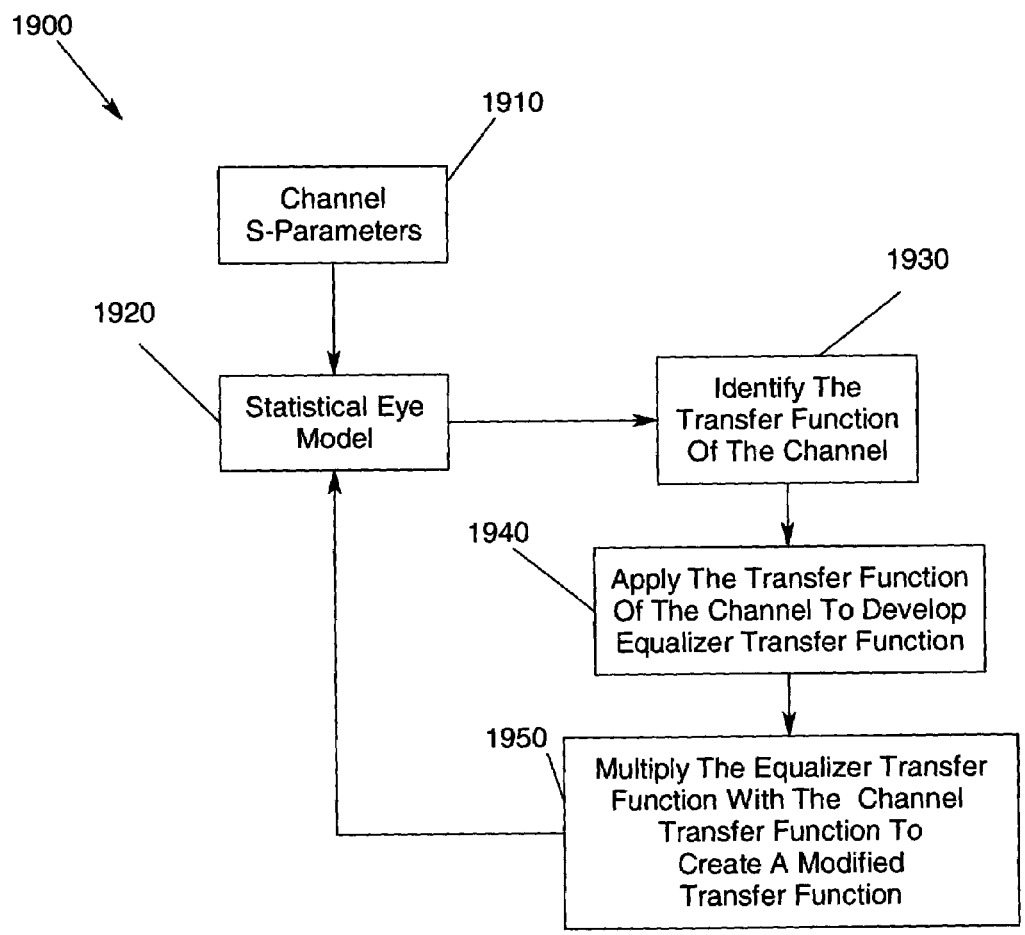
FIG. 17 illustrates a diagram demonstrating an integrated implementation of the statistical eye algorithm according to an embodiment of the present invention.

FIG. 17 illustrates a diagram 1900 demonstrating an integrated implementation of the statistical eye model according to an embodiment of the present invention. The S-parameters of the channel are measured 1910. The measured S-parameters are provided to a statistical eye model 1920. The transfer function of the channel is identified 1930. The transfer function of the channel is applied to develop an equalizer transfer function 1940. The equalizer transfer function is multiplied with the channel transfer function to create a modified transfer function that is used with the statistical eye model 1950. Accordingly, the statistical eye model may be configured to provide an integrated process for determining compliance for an equalized channel.

Figure 18:
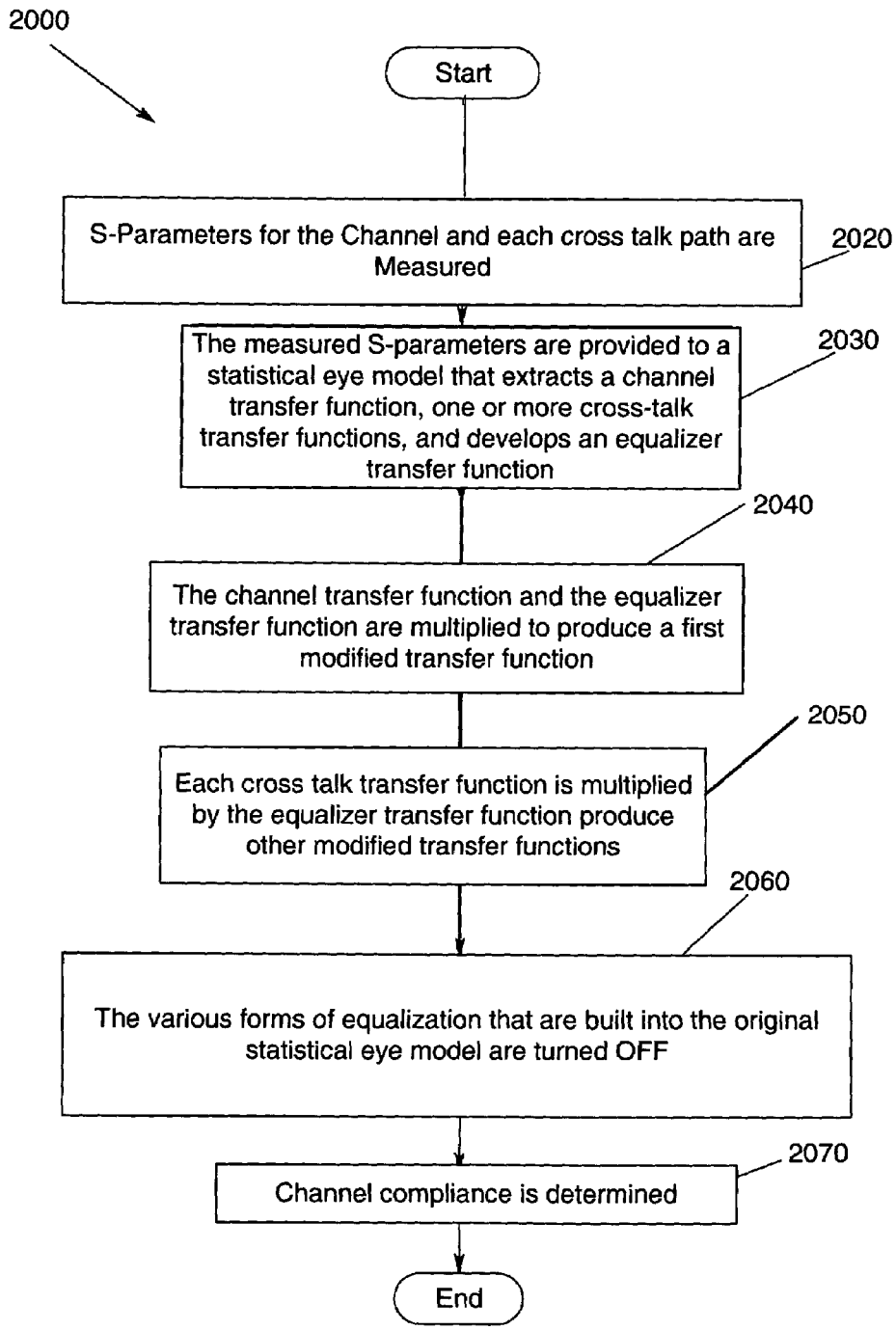
FIG. 18 illustrates a flow chart of the integrated method for equalizing a channel using a statistical eye algorithm according to an embodiment of the present invention.

FIG. 18 illustrates a flow chart 2000 of the integrated statistical eye model for determining channel compliance according to an embodiment of the present invention. The S-parameters for the channel and each cross talk path of a plurality of cross talk paths are measured 2020. At step 2030 measured S-parameters are provided to an integrated statistical eye model that extracts a channel transfer function, a cross talk transfer function for each cross talk path, and develops an equalizer transfer function. The channel transfer function and the equalizer transfer function are multiplied to produce a first modified transfer function 2040. Next, a first cross talk transfer function is multiplied by the equalizer transfer function to produce a second modified transfer function. A second cross talk transfer function is multiplied by the equalizer transfer function to produce a third modified transfer function and so forth for each cross talk path 2050. After the procedure has been performed for each crosstalk path, the various forms of equalization that are built into the original statistical eye model are turned OFF 2060. Channel compliance is determined accordingly 2070.

Software instructions can be expressed in any of a variety of well-known computer languages, including MATLAB®, FORTRAN, C, C++, Java, etc. Some embodiments of the present invention have used the software package MATLAB® to implement the combined statistical eye channel compliance method and linear continuous-time equalization. However, other high-level application programming interfaces can be used for the same purpose. Attention is also directed to Computer Appendices A-D submitted on CD and incorporated herein by reference. Appendices A-D include MATLAB® scripts for implementing a combined statistical eye channel compliance method and linear continuous-time equalization according to an embodiment of the present invention.

Appendix A includes a MATLAB® script for implementing a modified statistical eye having linear continuous-time equalization built into the statistical eye model. Appendix B includes a MATLAB® script for finding the best poles and zeros to implement an equalizer according to an embodiment of the present invention.

The MATLAB® script of Appendix B is called by the MATLAB® script of Appendix A. Inputs for the MATLAB® script of Appendix B include the array of frequencies at which the channel magnitude data is available; the array of channel magnitude data in dB, the number of samples to use in a "running-average" smoothing filter, the name of an input file that is used by the statistical eye and the master set of parameters known to and used by the statistical eye. It outputs include the best (optimum) pole frequencies, the best zero frequencies, the set of frequencies at which the optimization was performed, the equalizer transfer function magnitude calculated at the set of frequencies at which the optimization was performed using the best poles and best zeros, the equalizer complex transfer function calculated at frequencies Fvals and using the best poles and best zeros. Appendix C includes a MATLAB® script for finding the magnitude of the transfer function at specified frequencies. The MATLAB® script of Appendix C is called by the MATLAB® script of Appendix B. Appendix D includes a MATLAB® script that is an optimization program that implements a simplex algorithm. Appendix D also includes two examples of using function [ . . . ]=simplexe( . . . ). The MATLAB® script of Appendix D is called by the MATLAB® script of Appendix B. The MATLAB® scripts provided herein are not meant to limit the invention and variations are possible within the scope of the present invention. Such variations in keeping with the scope of the present invention are within the skill of the a person in the art.

Figure 19:
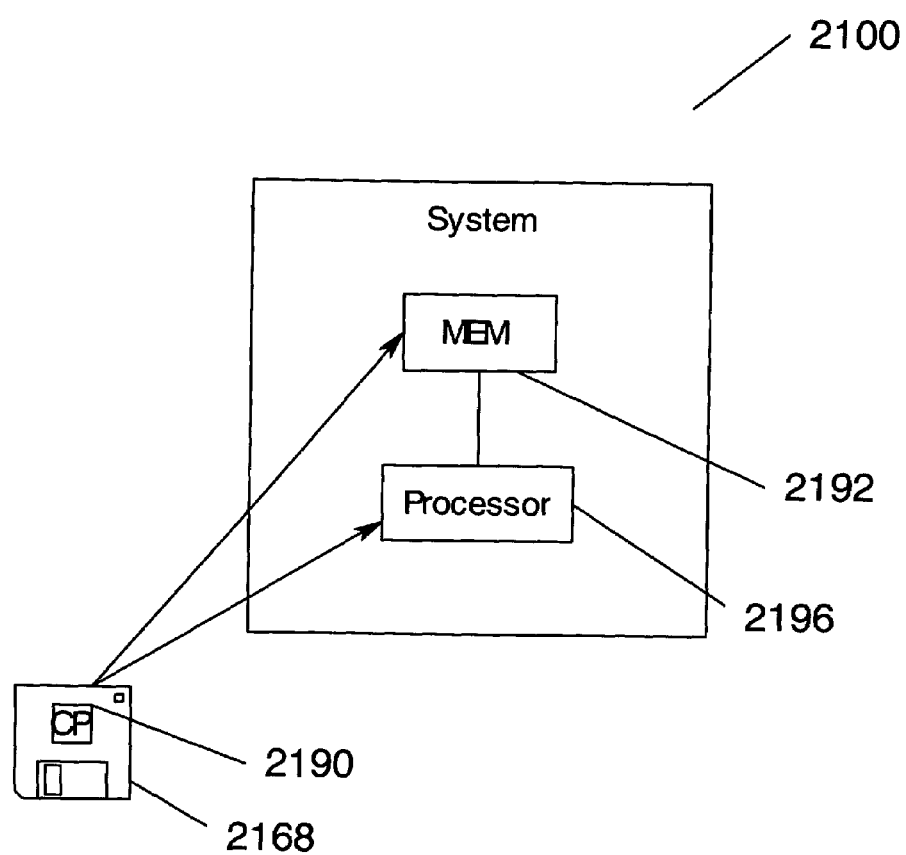
FIG. 19 illustrates a transceiver system for using the combined statistical eye channel compliance method with linear continuous-time equalization according to an embodiment of the present invention.

FIG. 19 illustrates a transceiver system 2100 for using the combined statistical eye channel compliance method with linear continuous-time equalization according to an embodiment of the present invention. The process illustrated with reference to FIGS. 1-18 may be tangibly embodied in a computer-readable medium or carrier, e.g. one or more of the fixed and/or removable data storage devices 2168 illustrated in FIG. 19 or other data storage or data communications devices. A computer program 2190 expressing the processes embodied on the removable data storage devices 2168 may be loaded into the memory 2192 or into the controller system 2100, e.g., in a processor 2110, to configure the controller system 2100 of FIG. 19, for execution. The computer program 2190 comprise instructions which, when read and executed by the controller 2100 of FIG. 19, causes the controller system 2100 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A system for determining channel compliance, comprising:
    an equalizer receiving a signal from a channel;
    a processing device, coupled to the equalizer, configured to obtain parameters describing the channel and equalizer parameters, to process the parameters describing the channel and the equalizer parameters to produce modified parameters, and to provide the modified parameters to a statistical eye model to determine channel compliance;
    wherein the parameters describing the channel comprise measured channel S parameters, the equalizer parameters comprise equalizer S parameters from the equalizer, and the modified parameters comprise the equalizer S parameters and the channel S parameters;
    wherein the processing device extracts a channel transfer function using the measured channel S parameters; and
    wherein the channel is determined to be compliant by the statistical eye model based on the modified parameters indicating that a pulse transmitted through the channel is received with a desired probability.

2. The system of claim 1, wherein the processing device is further configured to:
    produce an equalizer transfer function and multiply the channel transfer function and the equalizer transfer function to obtain a modified transfer function and apply the modified transfer function to the statistical eye model to determine channel compliance.

3. The system of claim 1, wherein the received signal comprises a signal from each of a plurality of channels.

4. The system of claim 1, wherein the equalizer comprises a linear continuous-time equalization circuit.

5. The system of claim 1 wherein the equalizer comprises a discrete time filter.

6. The system of claim 5 wherein the discrete time filter comprises either a finite impulse response filter or a decision feedback equalizer.

7. An apparatus, comprising:
    a data storage device configured with program instructions executable by a processing device to perform operations for achieving linear continuous-time equalization, the operations comprising:
        providing a statistical eye model for a channel;
        processing equalizer parameters and parameters describing the channel to produce modified parameters; and
        providing the modified parameters to the statistical eye model to determine channel compliance
        wherein the parameters describing the channel comprise measured channel S parameters, the equalizer parameters comprise equalizer S parameters from the equalizer, and the modified parameters comprise the equalizer S parameters and the channel S parameters;
        wherein the operations further comprise extracting a channel transfer function using the measured channel S parameters; and
        wherein the channel is determined to be compliant by the statistical eye model based on the modified parameters indicating that a pulse transmitted through the channel is received with a desired probability.

8. The apparatus of claim 7, wherein the operations further comprise:
    producing an equalizer transfer function;
    multiplying the channel transfer function and the equalizer transfer function to obtain a modified transfer function; and applying the modified transfer function to the statistical eye model.

9. The apparatus of claim 7, wherein determining channel compliance comprises comparing a statistical eye produced by the statistical eye model to at least one predetermined channel requirement.

10. The apparatus of claim 7, wherein the equalizer parameters further comprise an equalizer transfer function, and wherein the processing further comprises multiplying the channel transfer function and the equalizer transfer function to obtain a modified transfer function, the modified transfer function being the modified parameters provided to the statistical eye model.

11. A system for determining whether a channel between a transmitter and a receiver complies with at least one predetermined requirement, the system comprising:

means for equalizing a signal received from the channel;
  means for obtaining parameters describing the channel and equalizer parameters;
  wherein the means for obtaining parameters describing the channel and equalizer parameters includes means for generating measured S-parameters for the channel;
  means for providing a statistical eye model for the channel;
  means for processing the S-parameters describing the channel and the equalizer parameters to produce modified parameters;
  means for providing the modified parameters to the means for providing the statistical eye model.

12. The system of claim 11, wherein the means for providing a statistical eye model for the channel, the means for processing the parameters describing the channel and the equalizer parameters to produce modified parameters and the means for providing the modified parameters to the means for providing the statistical eye model comprises an integrated statistical eye means for extracting a channel transfer function using the measured channel S parameters, for producing an equalizer transfer function, for multiplying the channel transfer function and the equalizer transfer function to obtain a modified transfer function and for applying the modified transfer function to the statistical eye model for testing channel compliance.

* * * * *